Figure 1:
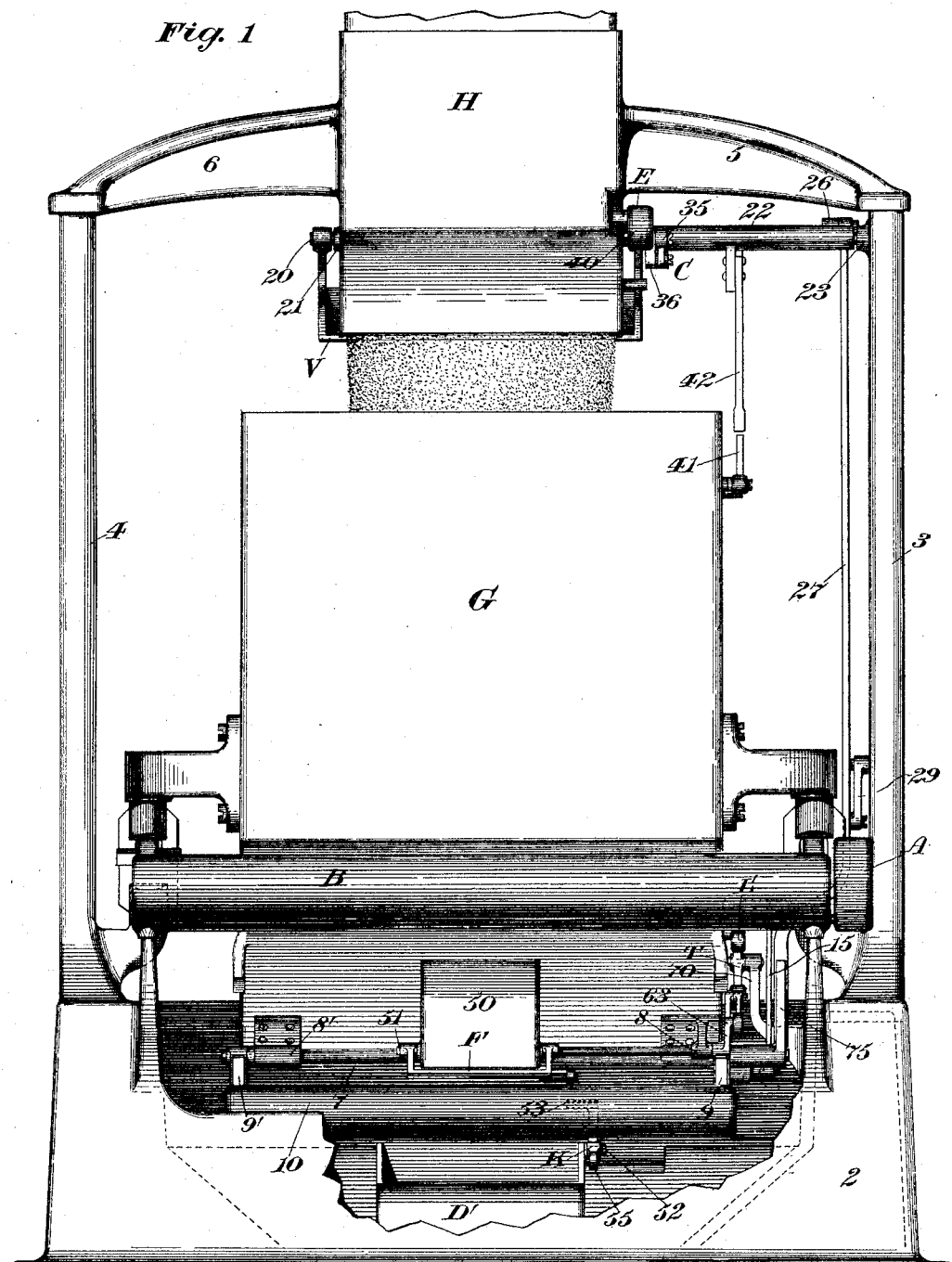

No. 616,859. Patented Dec. 27, 1898.
F. H. RICHARDS.
WEIGHING MACHINE.
(Application filed Feb. 23, 1898.)
(No Model.) 5 Sheets—Sheet 3.

Witnesses:
G. B. Rowley.
Fred. J. Dole.

Inventor:
F. H. Richards.

No. 616,859. Patented Dec. 27, 1898.
F. H. RICHARDS.
WEIGHING MACHINE.
(Application filed Feb. 23, 1898.)
(No Model.) 5 Sheets—Sheet 4.

Witnesses:
G. B. Rowley.
Fred. J. Dole.

Inventor:
F. H. Richards.

No. 616,859. Patented Dec. 27, 1898.
F. H. RICHARDS.
WEIGHING MACHINE.
(Application filed Feb. 23, 1898.)
(No Model.) 5 Sheets—Sheet 5.

Witnesses:
G. B. Rowley
Fred. J. Dole

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 616,859, dated December 27, 1898.

Application filed February 23, 1898. Serial No. 671,255. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines; and it includes as one of its features, in combination with weighing mechanism involving a load-discharger and load-reducing means therefor, a shiftably-mounted device disposed in the path of movement of the load-reducing means and adapted to engage and start the same in operation at a predetermined point, means being employed to hold said device, which may be a lever supported on the framework, against movement when engaged by the load-reducing means.

The closer for the load-receiver constitutes in the present case the load-discharger of the weighing mechanism, and the load-reducing means involves, preferably, a valve adapted normally to cover a load-reducing outlet in the load-receiver, the shiftably-mounted device mentioned being disposed in the path of the valve to open the same and being held when engaged by the valve, whereby the valve can be opened to permit the surplus to escape from the load-receiver, and on the opening of the closer to discharge the load the holding device for the lever passes free of the same, thereby releasing said lever, and hence the valve, so that the latter can freely open, whereby that part of the true load controlled by the load-reducing valve can be discharged.

Another object of the invention is to employ, in combination with weighing mechanism embodying a load-receiver provided with a closer and with an actuator, a stream-controller in position to be operated by the actuator, means in position to coact with the stream-controller and with the actuator and constructed to lock the actuator, and means preferably controlled by the closer for throwing the locking means into action when the closer is open and while the load is being discharged, whereby the stream-controller, and consequently its actuator, is locked against operation. When the closer reaches its fully-closed position on the discharge of a load, the stream-controller and its actuator are released, and the actuator will become immediately effective for retracting the stream-controller, which latter consists in the present case of a pan-valve, although it is evident that other means might be employed for regulating the supply.

Figure 2:
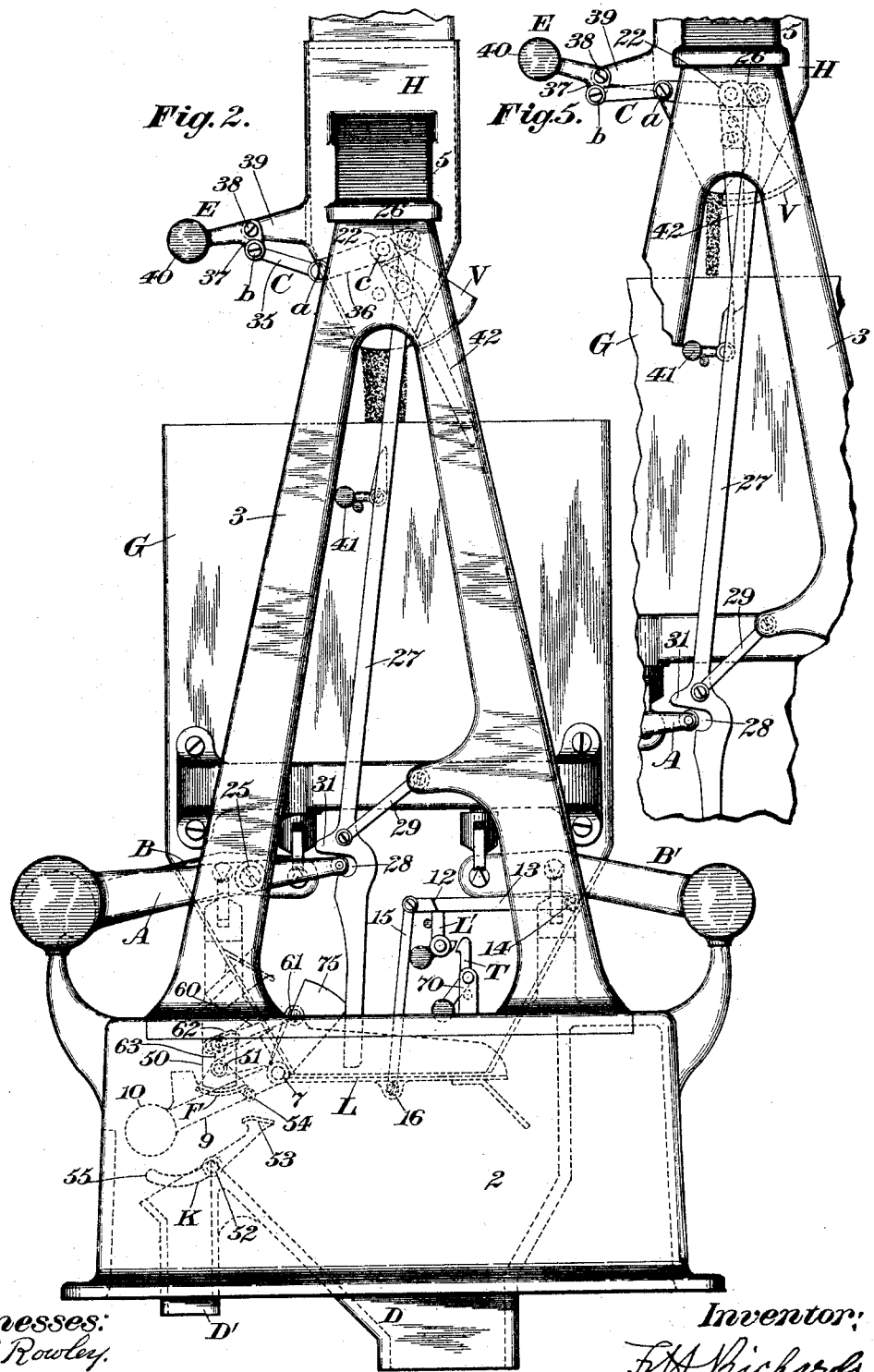
Figure 3:
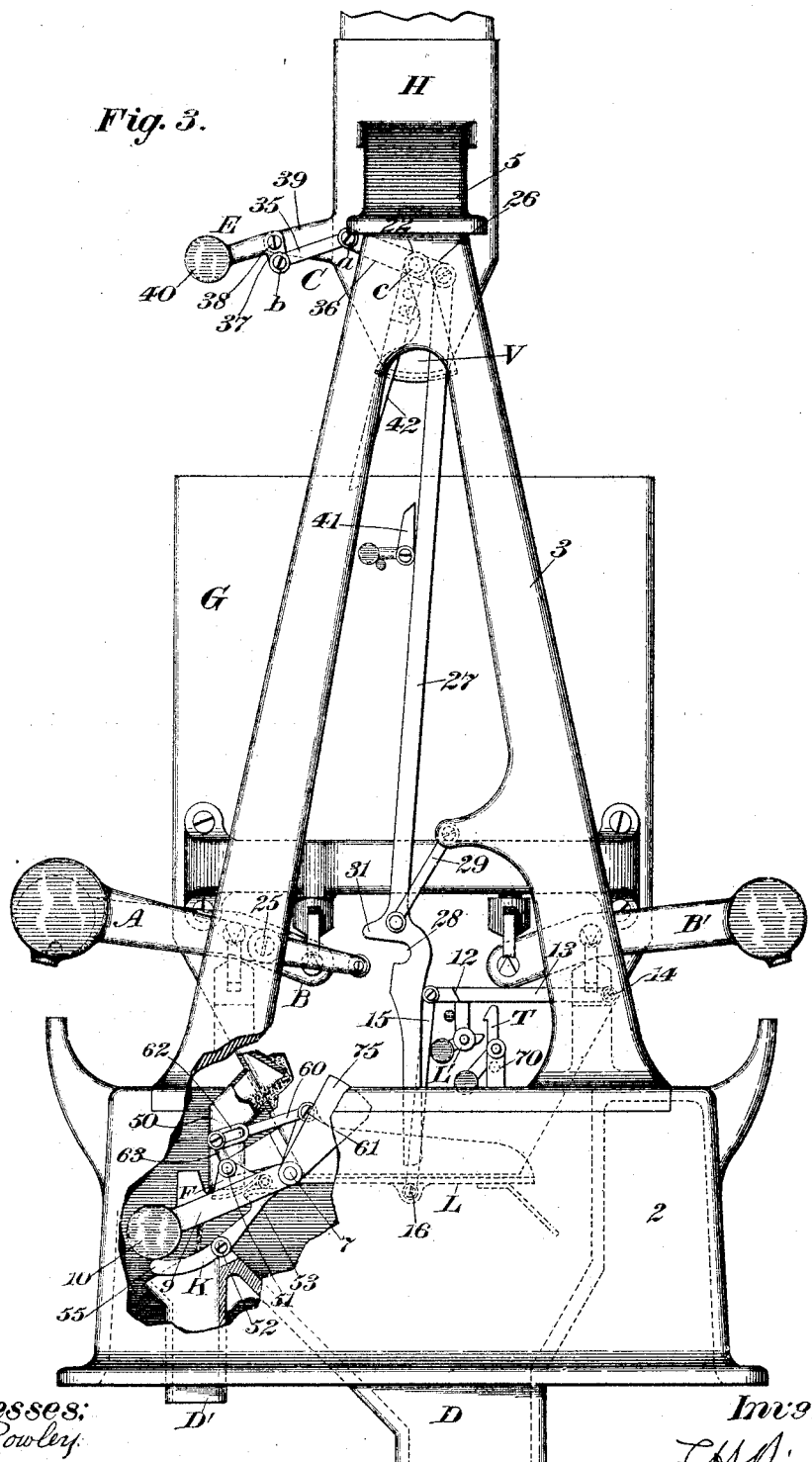
Figure 4:
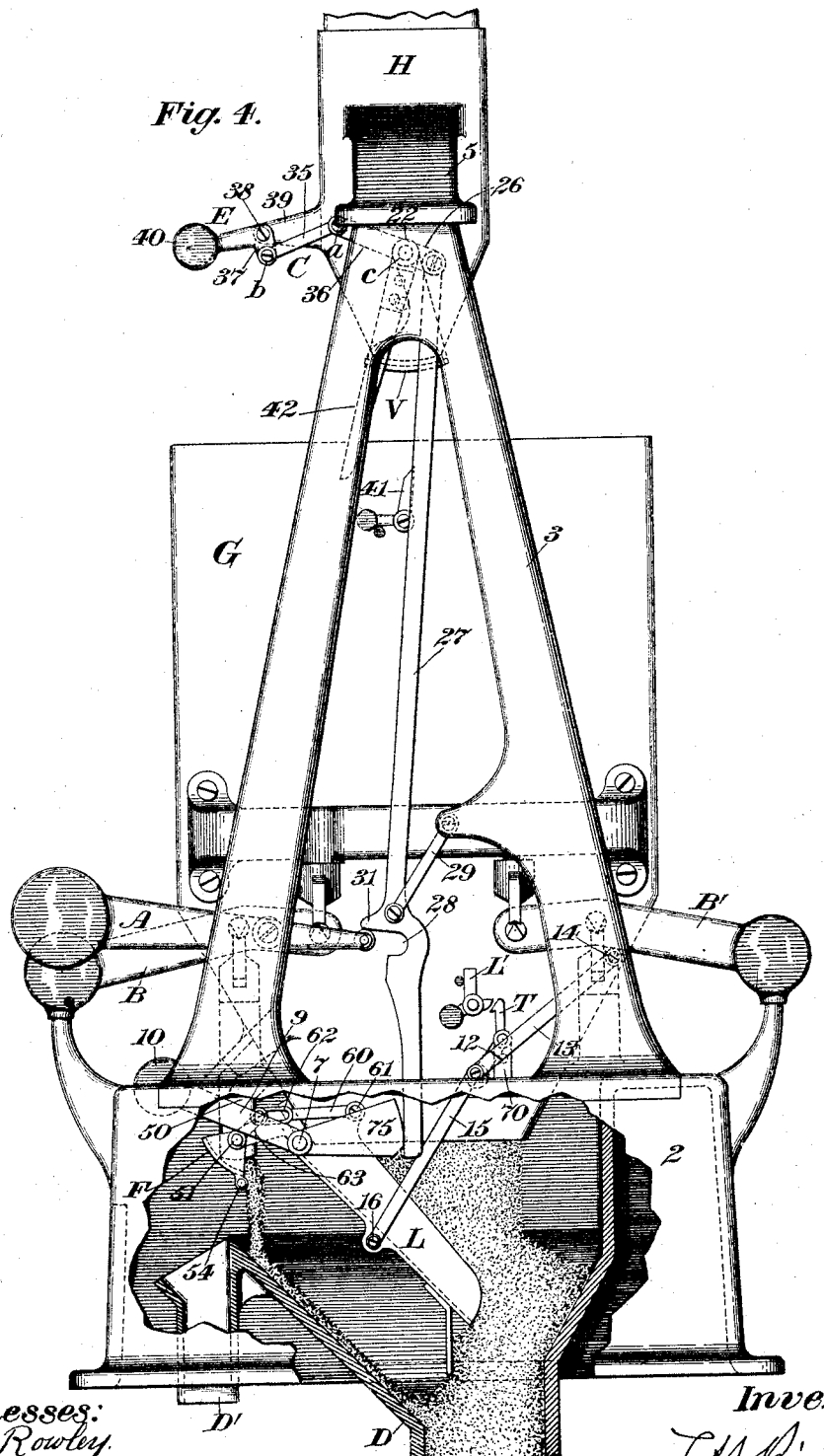
Figure 6:
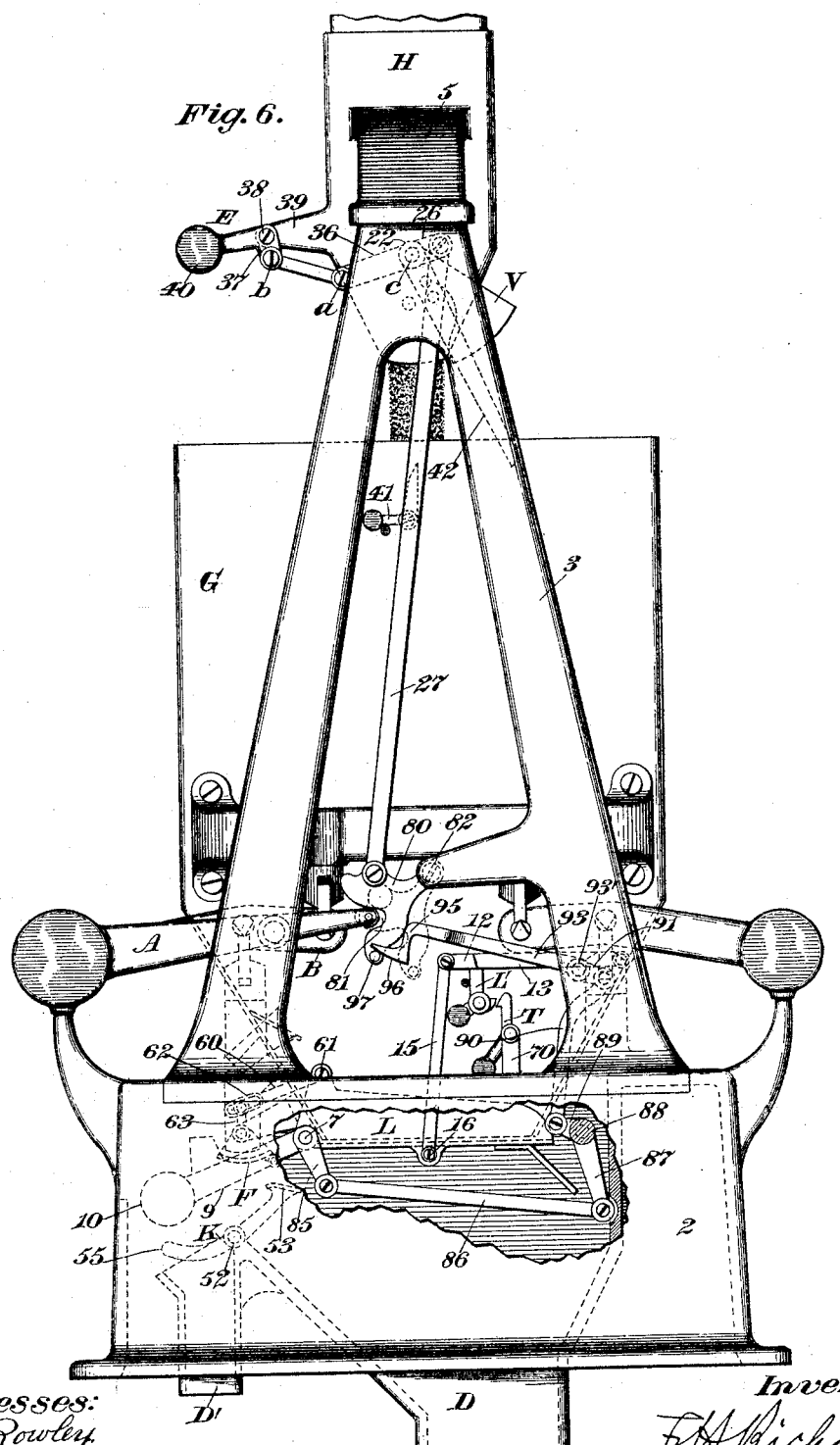

In the drawings accompanying and forming part of this specification, Figure 1 is a front elevation of my improved weighing-machine. Figs. 2, 3, and 4 are side elevations of the machine as seen from the right in Fig. 1, showing the positions occupied by the different parts during the making and discharging of a load. Fig. 5 is a detail in side elevation, illustrating the valve mechanism and the actuating and locking means in the position occupied thereby just before the cut-off of the supply; and Fig. 6 is a view similar to Figs. 2, 3, and 4, illustrating a modification thereof.

Similar characters designate like parts in all the figures of the drawings.

The framework for supporting the different parts of the machine may consist of the chambered base 2, the uprights or columns 3 and 4, rising therefrom, and the brackets 5 and 6, extending oppositely from the supply-hopper H, which constitutes a convenient means for delivering an overload to the load-receiver of the weighing mechanism.

The chambered base 2 contains two discharge-hoppers, as D and D', respectively, the larger being intended to receive the predetermined or true load, while the smaller is located to receive the surplus withdrawn from the weighing mechanism during the weighing of a load, and this surplus is usually reconveyed to the supply-hopper H.

The weighing mechanism involves a load-receiver, as G, and a plurality of supporting-beams, as B and B', mounted upon the base 2 and supporting the load-receiver G in the manner illustrated in Letters Patent No. 548,840, granted to me October 29, 1895, to which reference may be had, and said load-receiver has the usual discharge-outlet covered by a closer, as L, which when opened permits the discharge of the greater portion of the load, the remainder of the load being discharged by the operation of load-reducing means hereinafter described.

The closer L is fixed to the rock-shaft 7, carried by the brackets, as 8 and 8', respectively attached to the lower forward side of the load-receiver G, as indicated in Fig. 1, said rock-shaft having the forwardly-extending arms 9 and 9', joined by the counterweight 10, the purpose of which is to shut said closer on the discharge of a load.

The load-discharging means involves a latch, as L', pivoted upon the load-receiver and counterweighted to hold it in engagement with the shoulder 12 on the rod 13, pivoted, as at 14, at one end to the load-receiver and likewise jointed at its opposite end to the rod 15, pivoted, as at 16, to the load-discharger or closer. When the latch is disengaged from the shoulder, the closer will be released and can be forced open by the pressure of the mass in the load-receiver.

The supply-stream from the hopper H is controlled by a stream-controller, shown as a pan-valve V, which cuts off said stream when the load-receiver G is overloaded, at which time said load-receiver will have reached the limit of its descent, and during this period the load-reducing means is started in operation to effect the withdrawal of the surplus.

The valve V is pivotally supported for reciprocatory movement beneath the hopper and has on one side the pivot 20, loosely fitting in the hub or bearing 21 on one side of said hopper and at its opposite side the lateral projection 22, provided at its extremities with pivots fitting in bearings, as 23, on the hopper and side frame 3, respectively. The valve V is actuated by means operative with the weighing mechanism, the actuator A, pivoted, as at 25, near the inner end of the beam B being shown for this purpose, and it serves both to open and close the valve. The projection 22 has the crank-arm or offset 26, to which the rod 27 is pivoted, said rod having a socket 28 to receive the inner end of the actuator A, as represented in Fig. 2, and being connected with the side frame or upright 3 by the interposed link 29, pivoted to these parts. The rod 27, in addition to transmitting the effect of the actuator A to the valve V either for opening or closing said valve, serves as a locker for locking said actuator, and consequently the valve, as will hereinafter appear.

In Fig. 2 the valve V is represented wide open, at which time the full volume of the supply is flowing into the empty load-receiver, and when a certain portion of the load has been received the load-receiver, and consequently the inner ends of the beams B and B' and the actuator A, will move in a corresponding direction, whereby the actuator will pull the rod 27 downward, and by reason of the connection between the rod and the valve the latter will be swung under the hopper H and the supply will be cut off when the load-receiver is overloaded, and the link 29 is so mounted as to cause the rod 27 to swing laterally and away from the actuator A and out of contact therewith when the load-receiver contains a quantity of material substantially equal to the predetermined load, whereby the actuator and beam mechanism and load-receiver can descend farther without operating the valve, as shown in Fig. 3. When the surplus is being removed, the parts will slowly return to their normal positions and the actuator will strike the shoulder 31 at the mouth of the socket 28 at about the time the surplus is fully withdrawn, at which time the load will be discharged, and means will be simultaneously rendered effective for locking the actuator against return movement with the weighing mechanism, whereby, although the load-receiver rises, the valve V cannot be opened, as will be hereinafter described.

The descent of the load-receiver is retarded, preferably, so as to insure its being overloaded, and for this purpose a device of suitable character is connected to the weighing mechanism through the connection 22 by means involving a toggle, as C, consisting of the pivoted members 35 and 36, the last-mentioned of which is fixed to the connection just mentioned, while the other is pivoted to the angular arm 37 of the counterweighted resistance device or lever E, pivoted, as at 38, to the bracket 39 on the hopper H.

At the commencement of operation, as shown in Fig. 2, and for a predetermined period during the closure of the valve V the point or center $a$ of the toggle C is below a straight or dead-center line passing through the extreme points $b$ and $c$ thereof, so that the weight 40 at the free end of the resistance-lever E applies a relatively great resistance to the weighing mechanism through the projection 22 and rod 27, as will be obvious, the resistance decreasing, of course, as the dead-center line is approached by the point $a$, and when said point has crossed the line the further progress of the valve will be interrupted sufficiently to permit a reduced stream to enter the load-receiver, as indicated in Fig. 5, to overload the load-receiver, and when the valve is released the weight 40 is free to drop and in doing so imparts a powerful thrust to the valve through the intermediate toggle mechanism for promptly shutting the same. The device for intercepting the valve in the manner specified consists of a well-known by-pass, as 41, adapted to be engaged by the rod 42, fixed to and depending from the projection 22, in the manner indicated in Fig. 5.

As hereinbefore stated, the load-receiver is overloaded from the hopper H, and when it reaches the limit of its descending movement the surplus is withdrawn by suitable load-reducing means, involving in the present case a load-reducing valve, as F, covering the outlet of the load-reducing spout 50, depending from the load-receiver G near its lower end, said valve being pivoted, as at 51, to the load-reducing spout and being adapted to swing in opposite directions, first to direct the surplus into the auxiliary hopper D' and subsequently to deliver a part of the predetermined load or that which remains in the spout 50 after the withdrawal of the surplus into the main hopper D.

The valve F is swung in one direction by an actuator, as K, consisting of a lever pivoted between its ends, as at 52, at a point near the junction of the two hoppers D and D', the working end 53 of the lever being disposed in the path of the projection 54 on the valve, so as to swing said valve open, and at this time the opposite end of the lever or actuator K will be held, as by the closer-shutting counterweight 10.

When the load-receiver is in its upper position, the load-reducing valve F will be shut, and when the load-receiver is overloaded the projection 54 of said valve will strike the working end 53 of the lever K, and the counterweight 10 will strike the opposite end 55 of said lever to hold the same, so that the valve F will be swung under the spout 50, as represented in Fig. 3, to permit a thin stream to pass from the load-receiver and enter the hopper or conduit D', serving as a surplus-receiver, and as the surplus flows from the load-receiver the latter will rise, so that the valve F is permitted to swing under the discharge-opening of the spout 50 to cut off the stream issuing therefrom, this operation being concluded when the surplus is completely removed.

The valve F is swung in a direction opposite to that just indicated on the opening of the closer, whereby that part of the load in the spout can be discharged into the main hopper D, and for effecting this operation of the valve I preferably connect the same with the closer by means involving a sliding or slip joint.

A link is shown at 60, pivoted at 61 to the closer at a point above the axis thereof, the opposite end of the link terminating in a loop embracing the projection 62 on the crank-arm 63 of the load-reducing valve, and the parts are so organized that the valve F can freely open to permit the surplus to escape by reason of the joint just set forth.

The latch L' is operated by a tripper, as T, of ordinary construction, pivotally supported upon the post 70, fixed to the base 2 and adjacent to the latch-tripper, it being of the "by-pass" type and being adapted to trip the latch on the upstroke of the load-receiver. When the latch is disengaged from the offset 12, the closer L is released by the pressure of the material in the load-receiver forcing the same open, as shown in Fig. 4, and at the same time the link 60 is drawn to the right, so that the valve F is swung wide open, as also represented in said figure, so that the material in the spout 50 can freely run therefrom as it forms a part of the predetermined or true load.

When the closer is opened, the valve-actuator A is locked against return movement with the beam mechanism and the load-receiver G, so that the valve V cannot be opened to permit the supply-stream to enter the emptying load-receiver, and the rod 27 serves as a locker for preventing the return movement of said actuator, it being thrown into an operative position by means controlled by the closer, such as the arm 75, fixed to the rock-shaft 7, said arm being adapted on the opening of the closer, as represented in Fig. 4, to impinge against the lower or extended end of the rod 27, so as to hold said rod in its extreme shifted position, and consequently hold the actuator A against return movement with the beam mechanism. When the closer shuts, the arm 75 will pass out of contact with the rod 27, thereby releasing the same, and consequently the actuator A, whereby the latter can return to its primary position, and in so doing it imparts an upward thrust to the rod 27 for swinging the valve V open.

The operation of the hereinbefore-described machine is as follows: In Fig. 2 the parts are shown in the positions occupied thereby at the commencement of operation, the closer L being shut and held in such position by the latch L' in engagement with the offset 12 on the arm 13 and the valve V being wide open, whereby the full volume of the supply can enter the empty load-receiver from the hopper H, and when a predetermined portion of the overload has been received the load-receiver will descend, so that the actuator A, acting through the intermediate connections hereinbefore described, will shut the valve V to cut off the supply, and when the supply is cut off the projection 54 on the valve F will strike the end 53 of the lever K, and at the same time the weight 10 will strike the opposite end of said lever, whereby the valve F will be swung open to permit the surplus to pass into the conduit D', and as the surplus is withdrawn the load-receiver will rise, and during this operation the tripper T trips the latch L' to release the closer L, which then opens to discharge the contents of the load-receiver and serves, through the connections hereinbefore described, to open the valve F to permit the contents of the spout 50 to pass into the hopper D. When the load is entirely discharged, the closer L will be shut by the counterweight, following which the several parts will be returned to their primary positions in the manner hereinbefore set forth.

In Fig. 6 I have illustrated a modified form of devices for locking the actuator A, in which construction the rod 27 is made shorter and a plate 80 is pivoted thereto, the part 80 serving as a locker and being held in its working position by means now to be described, connected with the rock-shaft 7 and having a socket 81 to receive the end of the actuator A. The rock-shaft 7 is provided with a crank-arm 85, to which the link 86 is pivoted, said link being likewise jointed to the arm 87 of the angle-lever 88, pivoted in the base 2, the other arm 89 of said lever being pivoted to the link 90, also pivoted at its upper end to the arm 91 of the lever 93, pivoted to the upright 3, as at 93', and having the hook 95, one portion of which is provided with a curved face 96, resting normally on the pin 97 of the locking-plate 80. When the load is discharged, the locker will occupy the position shown by dotted lines in Fig. 6, and on the opening of the closer the hooked end of the lever 93 will be lowered, by reason of the connections described with the closer, to engage with the pin 97, thereby to lock the plate when the closer is opened. When the closer shuts, the motion will be reversed and the plate, and consequently the actuator, will be released.

The operation of the machine illustrated in Fig. 6 is the same as that shown in the other figures.

Having described my invention, I claim—

1. The combination, with weighing mechanism, of load-reducing means; a shiftably-mounted device disposed in the path of movement of the load-reducing means and adapted to engage and start said load-reducing means in operation at a predetermined point; and means operable before the discharge of the predetermined or true load for holding said shiftably-mounted device against movement when engaged by said load-reducing means.

2. The combination, with weighing mechanism involving a load-receiver having a load-reducing opening, of a valve for said opening; a shiftably-mounted device disposed in the path of movement of the valve and adapted to engage and open the same at a predetermined point; and means operable before the discharge of the predetermined or true load for holding said shiftably-mounted device against movement when engaged by the valve.

3. The combination, with weighing mechanism involving a load-discharger, of load-reducing means; a shiftably-mounted device supported independently of the weighing mechanism and disposed in the path of, and adapted to operate, said load-reducing means; means for holding said shiftably-mounted device against movement when engaged by the load-reducing means; and connections between the load-discharger and the load-reducing means for operating the latter on the movement of the load-discharger.

4. The combination, with weighing mechanism involving a load-receiver, of load-reducing means; a shiftably-mounted device disposed in the path of movement of the load-reducing means, having one end in position to be engaged thereby; and means operable before the discharge of the predetermined or true load for holding the opposite end of said shiftably-mounted device when engaged by the load-reducing means.

5. The combination, with weighing mechanism, of load-reducing means mounted upon the same; a lever carried by the framework one end in position to be engaged by the load-reducing means; and means for engaging the opposite end of said lever to hold the same when engaged by the load-reducing means.

6. The combination, with weighing mechanism involving a load-receiver having a load-reducing opening, of a valve for said opening; a shiftably-mounted device supported independently of the weighing mechanism and in position to engage and operate said load-reducing valve before the discharge of the predetermined load; and means on the weighing mechanism for holding said shiftably-mounted device when in engagement with the valve.

7. The combination, with weighing mechanism involving a load-receiver having a load-reducing opening, of a valve for said opening; a lever pivoted upon the framework, having one end disposed in the path of, and adapted to be engaged by, the valve; and means for holding the other end of said lever when thus engaged.

8. The combination, with weighing mechanism involving a load-receiver having a load-reducing opening, of a valve for said opening; a lever pivoted on the framework, having one end disposed in the path of the load-reducing valve and adapted to engage the same; and means for holding said lever when engaged by the valve.

9. The combination, with weighing mechanism involving a load-receiver provided with a closer, of overloading means; a load-reducing valve mounted on the load-receiver; a shiftably-mounted device disposed in the path of movement of, and one end of which is adapted to engage, the valve; means for holding the other end of said shiftably-mounted device whereby it can open the valve; and means connected with the closer for subsequently again opening said valve.

10. The combination, with weighing mechanism, of load-reducing means mounted for oscillation upon the load-receiver; a shiftably-mounted device disposed in the path of movement of the load-reducing means and adapted to engage and operate the load-reducing means in one direction; means for holding said shiftably-mounted device against movement when engaged by the load-reducing means; and means for subsequently and oppositely moving the load-reducing means.

11. The combination, with weighing mechanism involving a load-receiver provided with a closer, of a load-reducing valve on the load-receiver; a shiftably-mounted device on the framework one end of which is adapted to engage the valve; means operative with the closer for holding the other end of said shiftably-mounted device when it engages the valve, whereby the latter can be opened; and independent means operative on the discharge of a load for opening said valve.

12. The combination, with weighing mechanism involving a load-receiver provided with a closer, of overloading means; a load-reducing valve connected with the closer by means involving a slip-joint; a lever mounted upon the framework, one end of the same being disposed in the path of, and adapted to be engaged by, the valve; and means for holding the other end of the lever when it is engaged by said valve.

13. The combination, with weighing mechanism involving a load-receiver provided with a closer, of a load-reducing valve supported for oscillation upon the load-receiver and having a crank-arm provided with a projection; a link pivoted to the load-receiver and provided at its opposite end with a loop embracing said projection; a lever mounted upon the framework, one end of which is disposed in the path of, and is adapted to be engaged by, said valve; and means for holding the opposite end of the lever when thus engaged.

14. The combination, with weighing mechanism embodying a load-receiver provided with a closer, and with an actuator, of a stream-controller; means in position to coact with the stream-controller and the actuator and constructed to lock the stream-controller; and means operative with the closer for throwing said last-mentioned means into action to lock the actuator.

15. The combination, with weighing mechanism embodying a load-receiver provided with a closer, and with an actuator, of a stream-controller; means connected, respectively, with the stream-controller and with the framework and operative with the actuator to lock said actuator and also to transmit the power thereof to the stream-controller; and means operative with the closer for throwing said last-mentioned means into action to lock the actuator.

16. The combination, with a load-receiver and with supporting beam mechanism therefor, of an actuator mounted upon the beam mechanism; a stream-controller; means in position to coact with the stream-controller and the actuator and connected with the framework and constructed to lock the stream-controller; and means operative with the closer for throwing said last-mentioned means into action to lock the actuator.

17. The combination, with weighing mechanism embodying a load-receiver provided with a closer, and with an actuator, of a stream-controller; a rod connected with the stream-controller and framework, respectively, and controlled by the actuator; and means operative with the closer for throwing said rod into a position to lock the actuator.

18. The combination, with weighing mechanism embodying a load-receiver provided with a closer, and with an actuator, of a stream-controller; a rod connected, respectively, with the framework and with the stream-controller and having a socket to receive said actuator; and means operative on the discharge of a load for throwing said rod into position to lock the actuator.

19. The combination, with weighing mechanism embodying a load-receiver provided with a closer, and with an actuator, of a stream-controller in position to be operated by the actuator; a rod connected, respectively, with the stream-controller and the framework; and means connected with the closer for engaging said rod and holding it in position to prevent the return movement of the actuator with the weighing mechanism.

20. The combination, with weighing mechanism embodying a load-receiver provided with a closer, and with an actuator, of a stream-controller in position to be operated by the actuator; a rod connected with the stream-controller, and having a socket to receive the actuator; a link pivoted, respectively, to the rod and to the framework; and means operative with the closer for engaging said rod to hold the actuator against return movement.

21. The combination, with weighing mechanism involving a load-receiver, of overloading means for the load-receiver; a resistance device mounted upon the framework; connections between said resistance device and the weighing mechanism, said connections including a toggle and serving to transmit the effect of the resistance device to the load-receiver for retarding its descent during the overloading period; and devices for successively effecting the discharge of the surplus and the true load.

22. The combination, with weighing mechanism, of a stream-controller; connections between the stream-controller and the weighing mechanism for operating the former; a resistance device mounted on the framework; and a toggle connected, respectively, with the resistance device and with the stream-controller, and said resistance device and toggle being so mounted that the resistance device serves to apply its effect to the weighing mechanism through said toggle for retarding the descent of the load-receiver during the supply of material thereto.

23. The combination, with weighing mechanism including a load-receiver, of an actuator movable with the load-receiver; a stream-controller connected with the actuator; a lever fulcrumed upon the framework and having a weight; and a toggle connected, respectively, with the weighted lever and the stream-controller and serving to transmit the effect of said weighted lever to the stream-controller, and thereby to said actuator, for the purpose of retarding the descent of the load-receiver during the supply of material thereto.

24. The combination, with weighing mechanism involving a load-receiver, of a rock-shaft supported thereby; a closer fixed to the rock-shaft; a stream-controller having a projection provided with a crank-arm; a rod pivoted to said crank-arm and having a socket to receive said actuator; a link pivoted, respectively, to the rod and to the framework; and an arm on the rock-shaft, adapted to engage said rod.

25. The combination, with weighing mechanism involving a load-receiver provided with a closer, of overloading means for the load-receiver; a load-reducing valve; a shiftably-mounted device mounted on the framework, one end of which is adapted to engage the valve at a predetermined point; and a counterweight adapted to engage the other end of said device to hold the same, said counterweight being connected with and serving to shut the closer.

FRANCIS H. RICHARDS.

Witnesses:
F. N. CHASE,
JOHN O. SEIFERT.